Aug. 30, 1949.     F. R. GREYSON     2,480,726
ROTARY COOLING BIN

Filed Jan. 22, 1944     2 Sheets-Sheet 1

INVENTOR.
FREDERICK R. GREYSON.
BY

Aug. 30, 1949.  F. R. GREYSON  2,480,726
ROTARY COOLING BIN
Filed Jan. 22, 1944  2 Sheets-Sheet 2

INVENTOR.
FREDERICK R. GREYSON.
BY

Patented Aug. 30, 1949

2,480,726

UNITED STATES PATENT OFFICE 2,480,726

ROTARY COOLING BIN

Frederick R. Greyson, Oakland, Calif., assignor to Kaiser Company, Inc., Oakland, Calif., a corporation of Nevada Application January 22, 1944, Serial No. 519,322

16 Claims. (Cl. 134—80)

1

This invention relates to a method of cooling heated material and an apparatus for carrying out the same.

There are many materials which are subjected to comparatively high temperatures in the course of treatment thereof and are discharged from the treating apparatus at high temperatures which present serious problems in the handling of such materials, particularly where they are to be transported by conveyors or discharged into bins or into railway cars. Examples of such materials are coke, cement clinker, burnt lime, and the sinter discharged from sintering machines. I shall describe my invention more particularly as used for cooling sinter discharged from a sintering machine, it being understood that within the broader aspects of my invention it may be used for cooling numerous other materials, some of which have been referred to above. In carrying out my invention I provide a rotating bin structure disposed to receive the hot sinter as it is discharged from the sintering machine, means being provided for removing from the bin structure the cooled sinter and discharging it onto a conveyor which may transport the sinter to a bin, a storage pile, a car, or to any other suitable location. It is sometimes desirable in handling sinter to assist in the cooling by the application of a waterspray and I provide means for carrying off the water. I also provide means for delivering blocks of sinter to the cooling bin. I also provide means, in the nature of a retaining wall, whereby the blocks or slabs of sinter may be piled one upon the other, the means for removing the cooled blocks being so disposed as to remove the bottom blocks only, thus permitting of the blocks travelling with the bin throughout several rotations thereof so as to be effectively cooled before being discharged from the bin. Further objects and advantages of my invention will appear from the detail description.

Figure 1:
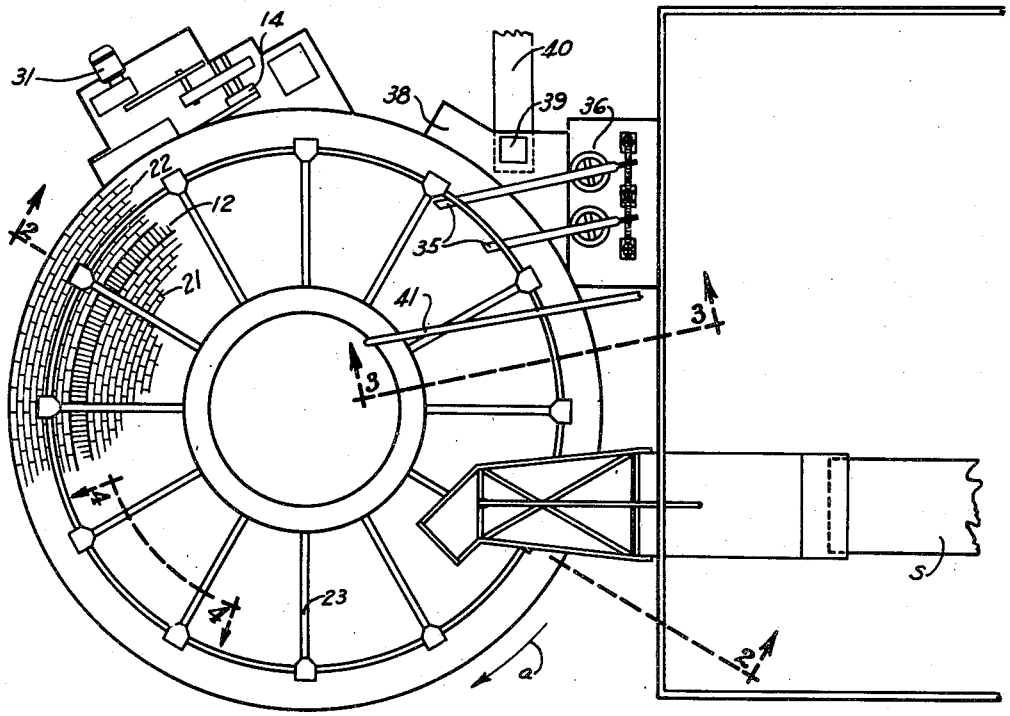
Figure 1 is a semi-diagrammatic plan view of a cooling bin embodying my invention, and associated parts.

2 and the supporting means therefor, taken along lines 4—4 of Fig. 1.

Figure 3:
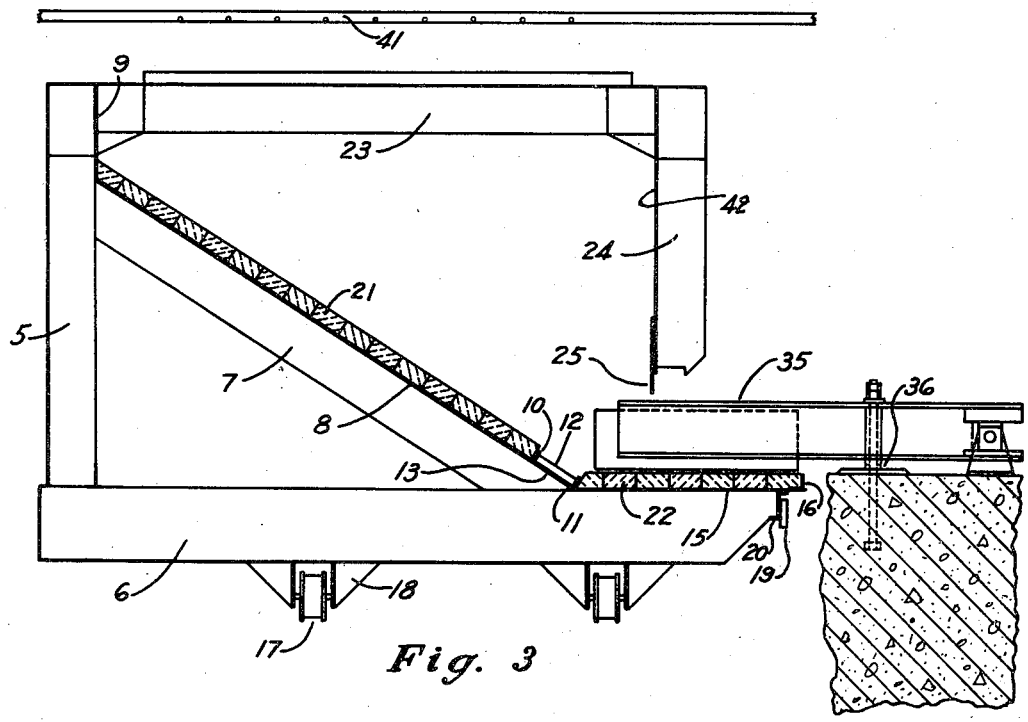
Figure 3 is a view partly in section, on an enlarged scale, taken substantially on line 3—3 of Figure 1 with many parts behind the section plane being omitted for the sake of clarity.

The cooling bin is provided with a structural steel frame comprising inner upright I beams 5, horizontal floor beams 6, and beams 7 secured to the beams 5 and 6 and inclined downward and outward of the bin. A deck 8 of plate steel is secured upon the upper faces of the inclined deck beams 7, and extends downward therealong from an inner retaining wall 9, also of steel plate, secured to the upper portions of the uprights 5. An angle strip 10 is secured on the upper faces of deck beams 7 at the lower edge of deck 8, in spaced relation to a circular angle strip 11 secured to beams 7 at the lower outer ends thereof. The angle strips 10 and 11 define between them a channel which receives cast iron grate bars 12 seating at their end portions on the strips 10 and 11, there being a space 13 between these strips, as shown more clearly in Figure 3. The portions of the floor beams 6 projecting outwardly beyond deck beams 7 are covered by plate steel 15, to the outer portion of which is secured an angle retaining strip 16. Suitably spaced flanged supporting wheels 17 are mounted in brackets 18 secured to certain of the floor beams 6, and a gear rack 19 is bolted or otherwise suitably secured to a frame member 20 of Z cross section secured to the outer ends of the floor beams 6. The frame includes various other bracing and connecting members, which need not be referred to in detail, the elements of this frame preferably being secured together by welding, though any other suitable securing means may be employed.

Figure 4:
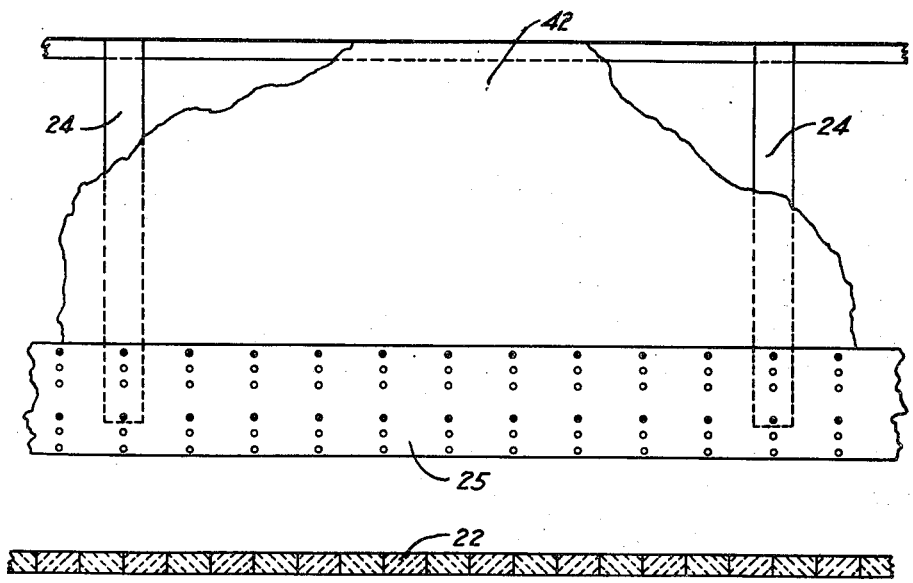
Figure 4 is a fragmentary detail view, on an enlarged scale, of the material retaining plate

The deck 8 is provided with a refractory covering 21, conveniently formed of fire bricks, laid thereon in a suitable manner, extending from the upper inner retaining wall 9 to the angle strip 10. Likewise, the deck 15 is provided with a refractory covering formed of fire bricks 22 laid thereon and extending from the angle strip 11 to the retaining angle strip 16. A plurality of upper horizontal arms 23 extend outwardly from the uprights 5, at the upper ends thereof, to which they are welded or otherwise suitably secured. Vertical arms 24 are secured to the outer ends of arms 23 and extend therefrom downward to within a short distance of the outer horizontal shelf portion of the bin, comprising the deck 15 and the refractory fire brick covering therefor, plates 42 shown in Fig. 4 being advantageously employed to cooperate in providing an outer wall for the rotating bin structure. A retaining plate 25, preferably formed of high carbon plate steel of suitable thickness, is mounted on the lower portion of the vertical arms 24, by means of bolts passing through openings in the plate and through the inner flanges of the arms 24, the latter being of I beam construction. As is shown more clearly in Figure 4, the retaining plate 25 is provided with a series of vertically spaced openings for each of the bolts, providing means whereby this retaining plate may be adjusted vertically to suit requirements. Conveniently, plate 25 may be formed in a plurality of sections, capable of separate adjustment, to facilitate adjustment of the plate as a whole.

Figure 2:
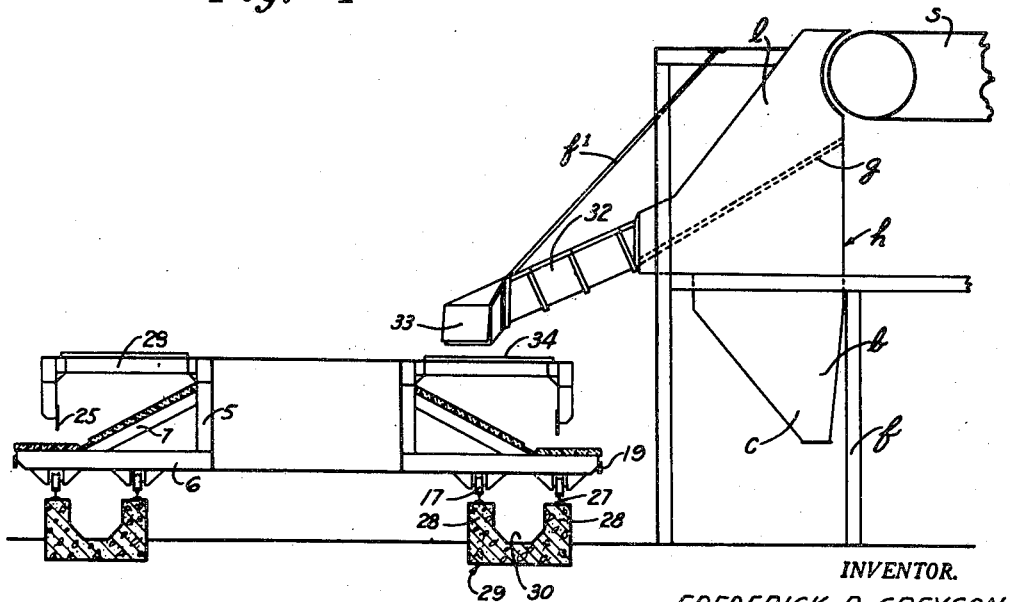
Figure 2 is a view partly diagrammatic and partly in section taken substantially on line 2—2 of Figure 1 with many parts behind the section plane being omitted for the sake of clarity.

Referring to Figures 1 and 2, the wheels 17 travel upon the spaced rails of the track 27 mounted upon uprights 28 of a suitable foundation 29 defining an inner trough 30. The bin structure is driven in any suitable manner, conveniently by means of an electric motor 31 having driving connection, through a gear reduction unit 14 of suitable type to the gear rack 19, the bin being rotated in a clockwise direction as indicated by the arrow a in Figure 1.

From what has been said it will be seen that the bin comprises a main inner portion of frusto-conical shape and a relatively narrow horizontal outer shelf portion, with a grating therebetween, the retaining plate or wall 25 overlying the horizontal shelf and serving to restrain the material against outward movement therealong as will be explained more fully presently. I have illustrated the cooling bin of my invention as used for cooling sinter discharged from a sintering machine s shown diagrammatically in Figures 1 and 2. This machine may be a continuous machine of the Dwight & Lloyd type, well known in the sintering art, comprising an endless track along which travel a train of pallets, this track having a return bend at the discharge end and a return bend at the feed end. The mixture to be sintered, which may include flue dust, metal ores, and various other substances, as is well known in the art, is deposited in a thick layer or bed in the pallets where it is ignited and sintered by downward combustion, the sinter being discharged from the pallets as the latter pass around the return bend at the discharge end of the machine. The sinter is thus broken off and discharged in large blocks or slabs. The machine s is provided, at its discharge end, with a hood h comprising a fines bin b shaped at its lower portion to provide a discharge chute c the outlet of which, in practice, is provided with a suitable gate or valve. A grate or grizzly, as it is termed in the sintering art, g, extends across the upper end of bin b, between the latter and a sinter discharge chute l. The sintering machine s is provided with a suitable frame f, and a chute 32, conveniently supported by an extension f¹ of frame f, extends downward from chute l over the conical portion of the bin, above the arms 23, this chute 32 being curved generally in plan and directed generally in the direction of rotation of the bin, as shown more clearly in Figure 1. The curved construction of the chute decreases the speed of delivery and the tumbling effect of a sinter block and aids in preventing breakage thereof, or the production of fines therefrom. At its lower end, chute 32 is provided with an outwardly swinging gate 33 and, at its upper end, this chute is disposed to receive the sinter blocks discharged from chute l. Preferably, each of the arms 23 is provided, at the upper face thereof, with a wear strip 34, which may be formed of cast iron or other suitable material, to take wear incident to movement of sinter thereover, that being desirable since the sinter in many cases is highly abrasive in character. The sinter discharged from chute 32 is deposited upon the inclined surface of the conical portion of the bin and slides downward therealong across the space above the grating and thence onto the outer horizontal shelf portion of the bin. The retaining plate or wall 25 is so adjusted that a block of sinter resting upon the outer horizontal shelf portion may move outward therealong, but an upper block resting upon a block resting on the shelf is restrained against outward movement by the wall 25. In the rotation of the bin, the sinter thereon is air cooled, and the lower blocks, resting upon the horizontal shelf, are then removed therefrom by scrapers 35 pivoted on posts 36 disposed to one side of the bin, these scrapers being adjusted and held in adjustment by associated screw adjusting means of suitable known type. The scrapers 35 are disposed a short distance above the upper face of the shelf portion of the bin, so as to remove therefrom the lower blocks of sinter resting thereon, the sinter blocks thus removed being deflected by the scraper into a hopper 38 extending beneath the cooling bin and provided with an outlet opening 39 overlying a belt conveyor 40 of suitable type. By the time the sinter blocks are removed from the bin, they have been sufficiently cooled so as to avoid danger of injury to the conveyor 40, and may then safely be handled thereby so as to be transported to a desired point for further treatment or for storage. By providing the retaining wall 25 and properly adjusting the same, several layers of sinter blocks may be supported upon the horizontal shelf portion of the bin, so that each block may make two or more rotations with the bin before being removed therefrom, assuring adequate cooling of the sinter blocks before discharge thereof into the hopper 38. If desired, a suitable number of spray pipes 41, one of which is shown, may be disposed above the main or conical portion of the bin, for spraying cooling water upon the sinter or other hot material thereon, to assist in the cooling operation, though that may not be necessary in many cases. It has been found advantageous in the cooling of sinter block to have one waterspray located just ahead of the delivery chute so that the block is deposited on the bin and makes substantially one complete rotation before coming into contact with the water spray. In this manner the block is partially cooled in air before water is applied, which results in less formation of steam pockets or the like, thereby subjecting the block to fewer shocks which would tend to crack and shatter it with the production of an appreciable amount of fines or small particles.

When cooling water is applied to the material, such as sinter blocks, as by means of a spray device extending over the cooling bin, the water runs down over the material lying on the inclined inner portion of the cooling bin, and falls between the grating bars 12 into trough 30 of foundation 29. Any undesirably small pieces which may be present at this stage will also fall thru the grating and into the trough. The water, with any other material which may have fallen thru the grating, is removed from the trough in any suitable manner. When it is desired to use the cooling bin for cooling materials other than sinter, such as materials in relatively small pieces or particles which would pass in objectionable amount through the grating, the space above the grating may be closed by suitable plates laid thereon between the angle strips 10 and 11, or in any other suitable manner. In that event, the particles of the materials do not pass through the grating, and the material under treatment flows downward along the conical portion of the bin and thence outward onto the horizontal shelf portion thereof. The scrapers 35 are then suitably adjusted for removing the cooled material from the horizontal portion of the bin and deflecting it to the hopper 38, and the retaining wall 25 is adjusted to suit the character of the material being cooled. In the case of material in small pieces or of granular material, retaining wall 25 is so adjusted that the angle of inclination of the outer side of the pile of material on the horizontal shelf portion is within the angle of repose of that material, avoiding flow of the material outward beyond the circumferential edge of the bin, such as would cause spillage and waste of the material. In the broader aspects of my invention, the chute 32 may be adjustable and may be considered as means for delivering to a cooling zone, preferably of annular form, blocks of sinter from the sintering machine s, or any other heated material, in block form or in the form of small pieces or granules, which it is desired to cool. Whether the material be in block form or in granular form, the structure illustrated and described herein constitutes, in effect, a revolving bin which receives the material being cooled and restrains it against outward movement, cooling of the material in this bin proceeding sufficiently to permit of the material being handled to advantage by a belt conveyor or other means when it is discharged from the bin. It will be understood, of course, that the diameter of the bin, its speed of rotation, and related features may be regulated to suit requirements in accordance with the particular material to be cooled.

It is an important advantage of this invention that material such as sinter blocks can be handled during cooling with a minimum amount of breakage and with very little, or no production of fines. It is another advantage that heated material can be sufficiently cooled before going to a conveyor belt that the latter does not undergo excessive wear, or destruction, by contact with the heated product.

As above indicated, and as will be understood by those skilled in this art, changes in construction and arrangement of parts of my invention may be resorted to without departing from the field and scope thereof, and I intend to include all such variations, as fall within the scope of the appended claims, in this application in which the preferred form only of my invention has been disclosed.

I claim:

1. In cooling means of the character described, a generally annular rotating bin structure having a downwardly and outwardly inclined inner portion and a substantially horizontal imperforate outer shelf portion spaced from the lower end of said inner portion comprising a refractory lined deck of sufficient width to retain substantial quantities of material to be cooled, and a grating between said inner and outer portions.

2. In cooling means of the character described, a generally annular rotating bin structure having a downwardly and outwardly inclined inner portion and a substantially horizontal imperforate outer shelf portion spaced from the lower end of said inner portion comprising a refractory lined deck of sufficient width to retain substantial quantities of material to be cooled, a grating between said inner and outer portions, a foundation, a circular track mounted on said foundation, and means rotatably mounting said bin structure on said track, said foundation defining a trough underlying said grating.

3. In cooling means of the character described, a rotating bin structure having a central opening and frame members extending upward about said opening, an inner retaining wall mounted on said frame members, an inner portion inclined downwardly and outwardly from said wall, an outer substantially horizontal shelf portion at the lower end of said inner portion, arms secured to said frame members extending therefrom outward over said inner and outer portions, and an outer retaining wall supported by said arms in substantially concentric overlying relation to said shelf portion and adjustable toward and away from the latter.

4. In cooling means of the character described, a generally annular rotating bin structure having a downwardly and outwardly inclined inner portion and a substantially horizontal imperforate outer shelf portion spaced from the lower end of said inner portion comprising a refractory lined deck of sufficient width to retain substantial quantities of material to be cooled, spaced supporting members respectively at the lower end of said inner portion and the inner side of said shelf portion defining an open channel therebetween, and grate bars supported on said supporting members defining a grating between said inner portion and said outer shelf portion.

5. In cooling means of the character described, a generally annular rotating bin structure having a downwardly and outwardly inclined inner portion and a substantially horizontal imperforate outer shelf portion spaced from the lower end of said portion comprising a refractory lined deck of sufficient width to retain substantial quantities of material to be cooled, spaced angle strips respectively at the lower end of said inner portion and the inner side of said shelf portion defining an open channel therebetween, and grate bars supported on said angle strips defining a grating between said inner portion and said outer shelf portion.

6. In cooling means of the character described, a generally annular rotating bin structure having a downwardly and outwardly inclined inner portion and a substantially horizontal imperforate outer shelf portion spaced from the lower end of said inner portion comprising a refractory lined deck of sufficient width to retain substantial quantities of material to be cooled, spaced angle strips respectively at the lower end of said inner portion and the inner side of said shelf portion defining an open channel therebetween, and grate bars supported on said angle strips defining a grating between said inner portion and said outer shelf portion, and means for delivering material to be cooled to said rotating bin structure.

7. In cooling means of the character described, a generally annular rotating bin structure having a downwardly and outwardly inclined inner portion and a substantially horizontal imperforate outer shelf portion spaced from the lower end of said inner portion comprising a refractory lined deck of sufficient width to retain substantial quantities of material to be cooled, spaced angle strips respectively at the lower end of said inner portion and the inner side of said shelf portion defining an open channel therebetween, and grate bars supported on said angle strips defining a grating between said inner portion and said outer shelf portion, and means for delivering material to be cooled to said rotating bin structure, and auxiliary cooling means operatively connected with said rotating bin structure so as to assist in cooling the material in the bin.

8. In cooling means of the character described in claim 7, wherein the auxiliary cooling means comprises a water spray.

9. A cooling device for sinter or the like comprising a rotatable table having a horizontal marginal portion and an upwardly inclined frusto-conical portion spaced from the lower end of the said inner portion, a grating in the space between said inner and outer portions, means to deposit material to be cooled on the frusto-conical portion whereby it will gravitate toward the horizontal portion, an annular wall supported above and concentric with the horizontal portion to cause said material to become stacked thereon, and a stationary scraper projecting under said wall to remove said material from the bottom of said stack.

10. A cooling device for sinter or the like comprising a circular rotatable table, means to deposit hot sinter or the like upon an imperforate surface at the interior of the table, a horizontal imperforate refractory lined deck at the outer section of the table of sufficient width to accommodate substantial quantities of sinter received from the interior of the table, means for removing the cooled sinter from the outer edge of the table, and an annular area of grating spaced inwardly from the outer edge of the table to permit escape of fines and liquid used in cooling.

11. In cooling means of the character described, a generally annular rotating bin structure having a downwardly and outwardly inclined inner portion of imperforate surface and a substantially horizontal outer shelf portion of imperforate surface comprising a refractory lined deck spaced from the lower end of said inner portion of sufficient width to receive substantial quantities of material to be cooled, a grating between said inner and outer portions, and a substantially vertical annular retaining wall overlying said shelf portion.

12. In cooling means of the character described, a generally annular rotating bin structure having a downwardly and outwardly inclined inner portion of imperforate surface and a substantially horizontal outer shelf portion of imperforate surface comprising a refractory lined deck spaced from the lower end of said inner portion of sufficient width to receive substantial quantities of the material to be cooled, a grating between said inner and outer portions, a substantially vertically annular retaining wall overlying said shelf portions, a foundation, a circular track mounted on said foundation, and means rotatably mounting said bin structure on said track, said foundation defining a trough underlying said grating.

13. In cooling means of the character described, a generally annular rotating bin structure having a downwardly and outwardly inclined inner portion and a substantially horizontal imperforate outer shelf portion spaced from the lower end of said inner portion comprising a refractory lined deck of sufficient width to receive substantial quantities of material to be cooled, and downwardly and outwardly inclined grating between said inner and outer portions.

14. In cooling means of the character described, a generally annular rotating bin structure having a downwardly and outwardly inclined inner portion of imperforate surface and a substantially horizontal outer shelf portion of imperforate surface comprising a refractory lined deck spaced from the lower end of said inner portion of sufficient width to receive substantial quantities of material to be cooled, a downwardly and outwardly inclined grating between said inner and outer portions, and a retaining wall overlying said shelf portion.

15. In cooling means of the character described, a rotating bin structure comprising a series of upwardly extending frame members arranged about the center of said bin, an inner retaining wall mounted on said frame members, an inner portion inclined downwardly and outwardly from said wall, an outer substantially horizontal shelf portion at the lower end of said inner portion, arms secured to said frame members extending therefrom outward over said inner and outer portions, and an outer retaining wall supported by said arms in substantially concentric overlying relation to said shelf.

16. In cooling means of the character described, a rotating bin structure having a downwardly and outwardly inclined inner portion with an inner retaining wall extending upward from its inner end and a substantially horizontal outer shelf portion, radial arms overlying said inner and outer portions and mounted on said inner retaining wall, an outer retaining wall, and means mounting said outer wall on said radial arms in substantially concentric overlying relation to said shelf portion.

FREDERICK R. GREYSON.

REFERENCES CITED

The following references are of record in the file of this patent:

UNITED STATES PATENTS

| Number | Name | Date |
|---|---|---|
| 188,763 | Wood | Mar. 27, 1877 |
| 321,636 | Penniman | July 7, 1885 |
| 654,647 | Koppelmann | July 31, 1900 |
| 665,835 | Miller | Jan. 8, 1901 |
| 676,070 | Manula | June 11, 1901 |
| 756,307 | Wheildon | Apr. 5, 1904 |
| 777,321 | Vance et al. | Dec. 13, 1904 |
| 830,542 | Trump | Sept. 11, 1906 |
| 857,722 | Coats | June 25, 1907 |
| 956,122 | Marshall | Apr. 26, 1910 |
| 1,055,456 | Feicks | Mar. 11, 1913 |
| 1,173,273 | Hubbard, Jr. | Feb. 29, 1916 |
| 1,466,996 | Dumont | Sept. 4, 1923 |
| 1,502,977 | Baldwin | July 29, 1924 |
| 1,644,342 | Mabee | Oct. 4, 1927 |
| 1,673,464 | McLaughlin | June 12, 1928 |
| 1,936,105 | Cole | Nov. 21, 1933 |
| 2,232,134 | Curran | Apr. 1, 1941 |
| 2,374,535 | Gibson | Apr. 24, 1945 |

FOREIGN PATENTS

| Number | Country | Date |
|---|---|---|
| 212,933 | Germany | Aug. 21, 1909 |